W. F. KIESEL, Jr.
TRUCK CONNECTION FOR LOCOMOTIVES AND CARS.
APPLICATION FILED DEC. 8, 1914.
1,133,971.
Patented Mar. 30, 1915.
2 SHEETS—SHEET 1.
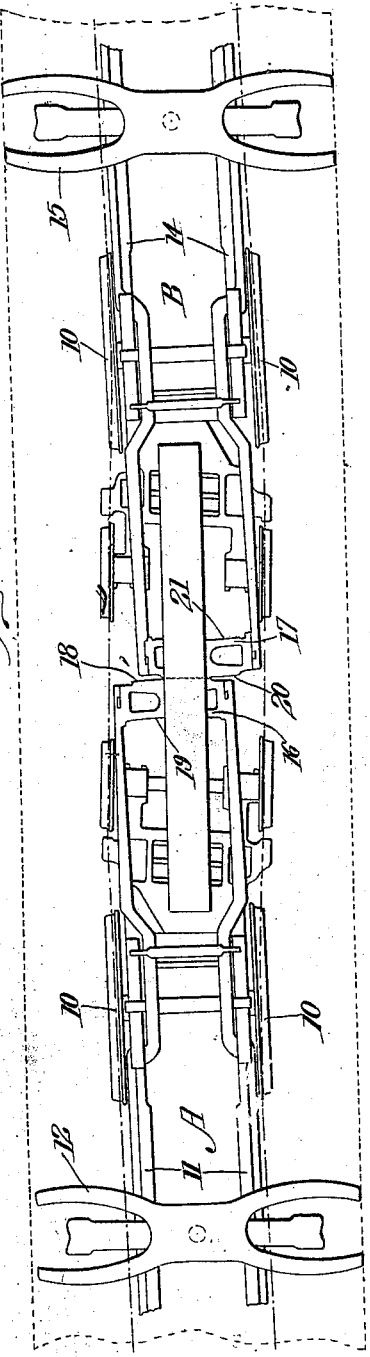
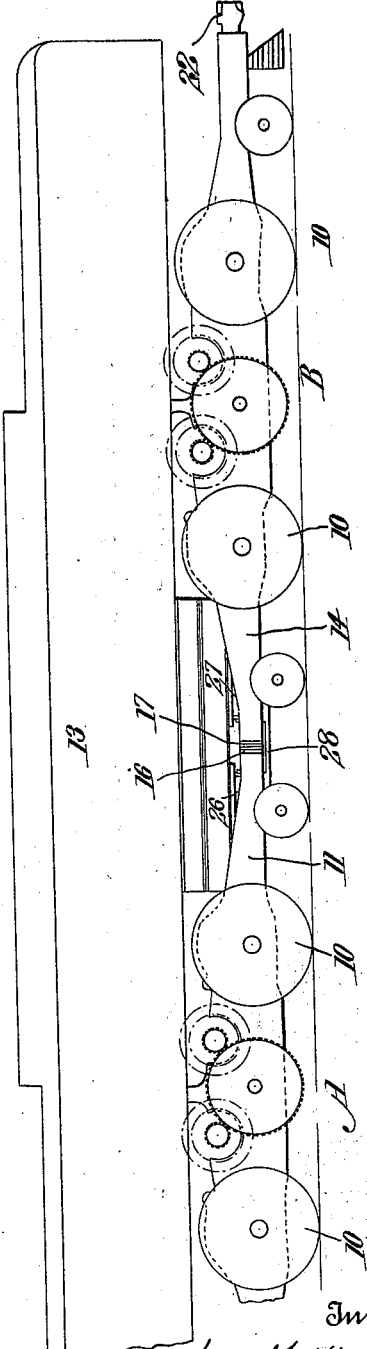

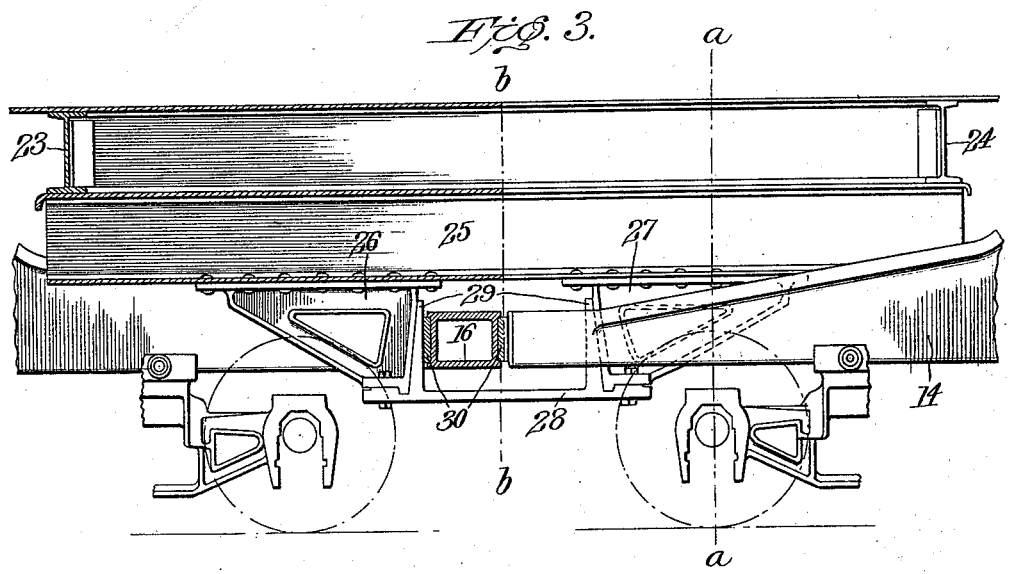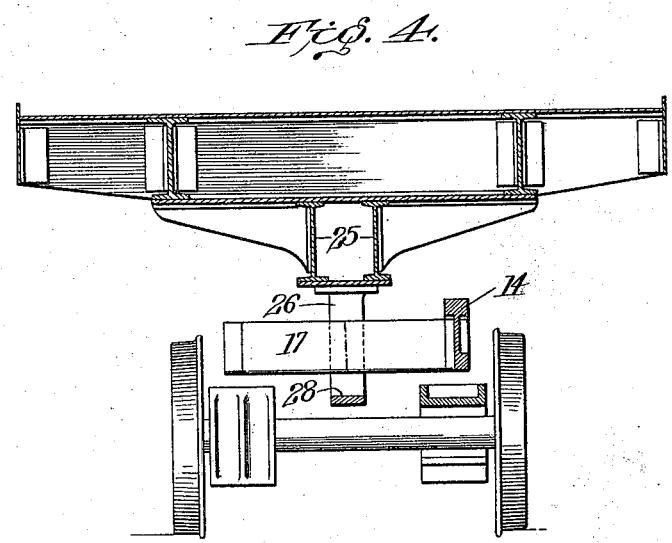

UNITED STATES PATENT OFFICE.

WILLIAM F. KIESEL, JR., OF ALTOONA, PENNSYLVANIA.

TRUCK CONNECTION FOR LOCOMOTIVES AND CARS.

1,133,971.  Specification of Letters Patent.  Patented Mar. 30, 1915.

Application filed December 8, 1914. Serial No. 876,131.

*To all whom it may concern:*

Be it known that I, WILLIAM F. KIESEL, Jr., a citizen of the United States, and a resident of Altoona, county of Blair, State of Pennsylvania, have invented a certain new and useful Improvement in Truck Connections for Locomotives and Cars, of which the following is a specification.

This invention relates to railway rolling stock, and more particularly to electric locomotives although it is applicable to cars and other types of rolling stock.

In designing large electric locomotives, to obtain maximum tractive effort within the restriction of maximum wheel weight on the rail, the resulting number of wheels necessitates an excessive cab length which in turn compels the use of a plurality of trucks.

One of the objects of this invention is to provide means for transferring the strains directly through the truck frames and practically in a horizontal plane passing through the draft gear.

Another object is to provide a connection between the truck frames which will permit the necessary relative movements of the trucks in passing around continuous or reverse curves or over crossings.

Another object of the invention is to provide a construction in which the ends of the truck frames are in abutting relation and a structure constituting a link between such ends is independently supported, for the purpose of transmitting pulling strains from one truck to the other.

A further object of the invention is to provide a connection between the trucks which will absorb the cab shocks arising from starting and stopping the locomotive.

A further object is to provide means for positively securing the cab to the truck frames so that it will not yield in a longitudinal direction, at the same time allowing freedom of movement vertically and transversely, the vertical movement being permitted by the springs and the transverse movement being necessary in order to permit passage around curves.

One form of the invention is illustrated in the accompanying drawings, in which, Figure 1 is a plan view of a pair of the trucks of a locomotive embodying the invention; Fig. 2 is a side elevation thereof with the cab shown in position above the trucks; Fig. 3 is an enlarged elevation and section of the truck connecting means; and Fig. 4 is a vertical section, the right half being on the line $a$—$a$ and the left half being on the line $b$—$b$ of Fig. 3.

Referring to the drawings, A, A, indicate generally the trucks of an electric locomotive. Each of these trucks is provided with driving wheels 10 and the driving wheels may be actuated in any preferred manner and since this part of the locomotive does not affect the present invention, a description thereof is believed to be unnecessary.

The truck A is provided with the usual side frames 11 on which is pivotally supported the body bolster 12 which carries one end of the body 13. The truck B is similarly provided with side frames 14 which carry the bolster 15, the latter supporting the opposite end of the cab 13. The inner ends of the side frames 11 are connected by an end casting 16 and the inner ends of the frames 14 are connected by a similar casting 17. As shown in Fig. 1, the castings 16 and 17 are in abutting relation and the abutting surface 18 of the casting 16 is curved on the arc of a circle about the center of the pivotal connection of the bolster 12. The inner surface 19 of the casting 16 is also curved about this center and is thus concentric with the surface 18. In a similar manner the surfaces 20 and 21 of the end casting 17 are curved about the center of the pivot of the bolster 15. When the locomotive is on a curve, as shown in Fig. 1, in which the trucks are indicated as on a reverse curve, the trucks are out of alinement with the body and in moving to and from this position of disalinement they swivel, with respect to the body, about the pivots of the bolsters 12 and 15. From Fig. 2 it will be evident that the end castings 16 and 17 are substantially in line with the coupler 22 at the end of the locomotive and therefore the strains are transferred from one truck frame directly to the other substantially in line with the draft gear.

Secured on the underside of the body 13 are cross beams 23 and 24 which support longitudinal beams 25. To the lower side of the beams 25 there are secured brackets 26 and 27. The lower ends of the brackets 26 and 27 are connected by a stirrup 28, the upwardly extending legs 29 of which engage the inner surfaces 19 and 21 of the end castings 16 and 17, respectively. From Fig. 3 it will be evident that the beams 25, brackets 26 and 27 and stirrup 28 constitute a link structure inclosing the end castings of the truck frames and forming a tension member through which pulling strains are transmitted directly from one truck frame to the other. It will also be evident that the curving of the surfaces 18, 19, 20 and 21 permits independent lateral movement of the ends of the truck frames and that sufficient clearance is provided between the beams 25 and the stirrup 28 to permit the necessary vertical movement of the truck frames relatively to the body. It will be understood that the body is usually supported by means of springs and the link construction just described, being supported by the body must have a certain freedom for vertical movement relatively to the end castings 16 and 17. The castings 16 and 17 will be preferably provided with wearing plates, as indicated at 30, these plates being made of some wear resisting metal, such as manganese steel.

It will be noted that the link structure connecting the end members 16 and 17 of the truck frames, being carried by the body, constitutes a connection between the body and trucks, midway between the truck pivots, which positively holds the body against longitudinal yielding in stopping or starting, although not restricting the necessary vertical and swiveling movements.

It will be understood that sufficient clearance will be provided between the parts to avoid binding. It will also be understood that the details of construction may be changed without departing from the spirit of the invention and therefore I do not wish to be limited to the exact details shown and described.

Having now described my invention what I claim and desire to secure by Letters-Patent is,

1. In railway rolling stock, the combination of a body, and independently swiveling trucks on which said body is supported and having frames, the adjoining ends of which are in abutting relation and curved to permit free lateral movement while maintaining the abutting relation, and a tension member connecting said adjoining ends but supported independently thereof.

2. In railway rolling stock, the combination of a body, and independently swiveling trucks on which said body is supported and having frames, the adjoining ends of which are in abutting relation and curved to permit free lateral movement while maintaining the abutting relation, and a tension member carried by said body and connecting said adjoining ends and whereby draft strains are transmitted from one truck frame to the other.

3. In railway rolling stock, the combination of a body, and independently swiveling trucks on which said body is supported and having frames, the adjoining ends of which are in abutting relation and curved to permit free lateral movement while maintaining the abutting relation, and a link inclosing said ends and forming a draft connection therebetween.

4. In railway rolling stock, the combination of a body, and independently swiveling trucks on which said body is supported and having frames, the adjoining ends of which are in abutting relation and curved to permit free lateral movement while maintaining the abutting relation, and a link supported by said body and inclosing said ends and forming a draft connection therebetween.

5. In railway rolling stock, the combination of a body, independently swiveling trucks on which said body is supported and having frames, the adjoining ends of which are in abutting relation and curved to permit free lateral movement while maintaining the abutting relation, and a link supported by said body and forming a draft connection between said ends, said ends being independently movable vertically and laterally in said link.

6. In railway rolling stock, the combination of a body, independently swiveling trucks on which said body is pivotally supported, said trucks having frames provided with end members arranged in abutting relation and the inner and outer vertical faces of said members being curved on arcs of circles about the pivotal connections between the trucks and said body, and a member engaging the inner surfaces of said end members and forming a draft connection therebetween.

7. In railway rolling stock, the combination of a body, independently swiveling trucks on which said body is pivotally supported, each of said trucks comprising side frames having their inner ends connected by a member, the inner and outer vertical faces of which are curved on arcs of concentric circles about the pivotal connection between the truck and the body, and a draft connection, between said end members, engaging said inner vertical faces.

8. In railway rolling stock, the combination of a body, independently swiveling trucks on which said body is supported, said trucks having frames provided with end members arranged in abutting relation, a pair of brackets suspended from the underside of said body, and a member arranged below said end members and connecting said brackets together.

9. In railway rolling stock, the combination of a body, independently swiveling trucks supporting said body, said trucks having frames provided with end members, and means carried by the body, between the swivel connections with the trucks, and engaging said end members to prevent longitudinal yielding of the body relatively to the trucks.

10. In railway rolling stock, the combination of a body, independently swiveling trucks supporting said body, and means carried by the body and arranged substantially midway between the swivel connections with the trucks, for rigidly engaging one or more of the truck frames to prevent longitudinal yielding of the body relatively thereto.

In testimony whereof I affix my signature in presence of two witnesses.

WILLIAM F. KIESEL, JR.

Witnesses:
J. C. STORM,
C. J. BERTRAM.

Copies of this patent may be obtained for five cents each, by addressing the "Commissioner of Patents, Washington, D. C."